(12) United States Patent
Swanson

(10) Patent No.: US 11,608,037 B1
(45) Date of Patent: Mar. 21, 2023

(54) LOW-PROFILE A-FRAME TRAILER JACK

(71) Applicant: Neil James Swanson, Prescott, MI (US)

(72) Inventor: Neil James Swanson, Prescott, MI (US)

( * ) Notice: Subject to any disclaimer, the term of this patent is extended or adjusted under 35 U.S.C. 154(b) by 0 days.

(21) Appl. No.: 17/960,065

(22) Filed: Oct. 4, 2022

Related U.S. Application Data

(60) Provisional application No. 63/473,515, filed on Jun. 6, 2022.

(51) Int. Cl.
*B60D 1/66* (2006.01)
*B66F 3/10* (2006.01)
*B60S 9/08* (2006.01)

(52) U.S. Cl.
CPC ............ *B60S 9/08* (2013.01); *B60D 1/66* (2013.01); *B66F 3/10* (2013.01)

(58) Field of Classification Search
CPC ..... B60D 1/66; B66F 3/10; B66F 3/08; F16H 57/0497; F16H 25/20; B60S 9/08
USPC ............................. 254/419, 102; 280/766.1
See application file for complete search history.

(56) References Cited

U.S. PATENT DOCUMENTS

| | | | |
|---|---|---|---|
| 1,933,777 A * | 11/1933 | Traut | B66F 3/10 254/102 |
| 3,595,527 A | 7/1971 | Douglass | |
| 3,851,855 A | 12/1974 | Douglass | |
| 4,238,113 A | 12/1980 | Adams | |
| 4,316,601 A | 2/1982 | Osborne | |
| 4,796,864 A | 1/1989 | Wilson | |
| 4,842,252 A | 6/1989 | McMahan | |
| 5,174,550 A | 12/1992 | Pittman | |
| 7,611,160 B1 | 11/2009 | Ignacio | |
| 8,091,922 B2 * | 1/2012 | McMahan | B60S 9/08 254/420 |
| 8,246,011 B1 | 8/2012 | Fox, III | |
| 8,348,241 B2 | 1/2013 | Trowbridge | |
| 8,910,924 B2 | 12/2014 | Alanko | |
| 9,308,894 B2 | 4/2016 | Lusty | |
| 10,730,488 B2 | 8/2020 | Moreno | |
| 2021/0370888 A1 * | 12/2021 | Peacemaker | B60S 9/08 |

FOREIGN PATENT DOCUMENTS

KR 101006695 B1 * 1/2021

\* cited by examiner

*Primary Examiner* — Mahdi H Nejad

(57) ABSTRACT

A low-profile trailer jack reduces the height of the jack above the trailer a-frame by over 50% eliminating pickup tailgate interference when lowered by a vehicle operator. This is accomplished using a two-stage concentric lead screw design rather than a single screw as described in prior art. The two-stage design also allows for increased lowering and raising speed of the jack foot by using the first stage, which is a larger outer screw with larger pitch, generating a faster speed when no load is present. The second stage inner screw is engaged when a load is present and a slower speed with greater mechanical advantage is required.

20 Claims, 6 Drawing Sheets

Vertical Cross Section - Extended

Current Design

Low-Profile Design

Pictorial View

Vertical Cross Section - Retracted

Vertical Cross Section - Extended

Horizontal Cross Section

Lead Screw Assembly Pictorial

LOW-PROFILE A-FRAME TRAILER JACK

BACKGROUND

Figure 1:
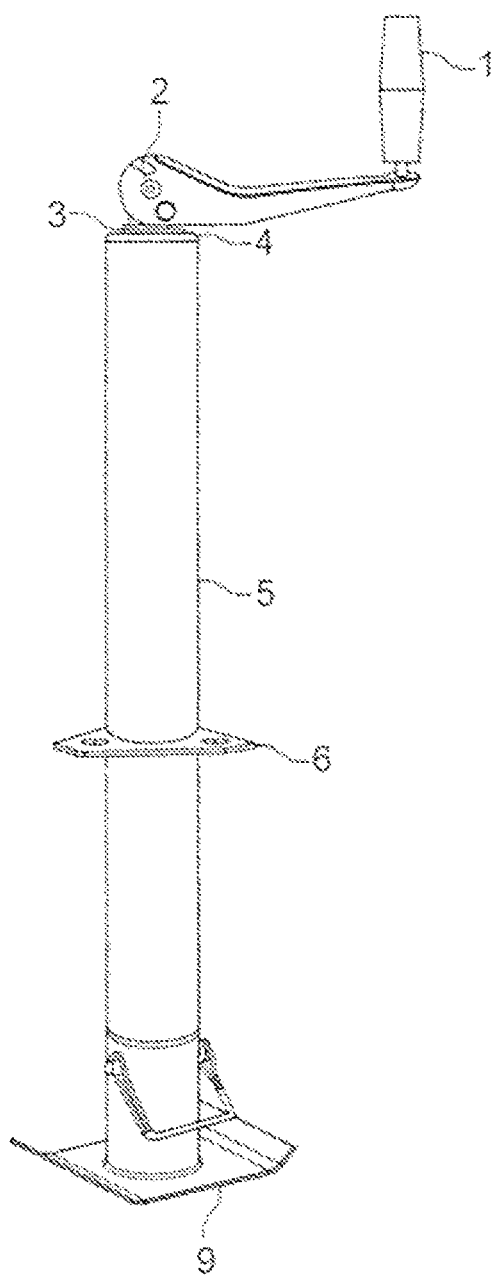
Figure 1:
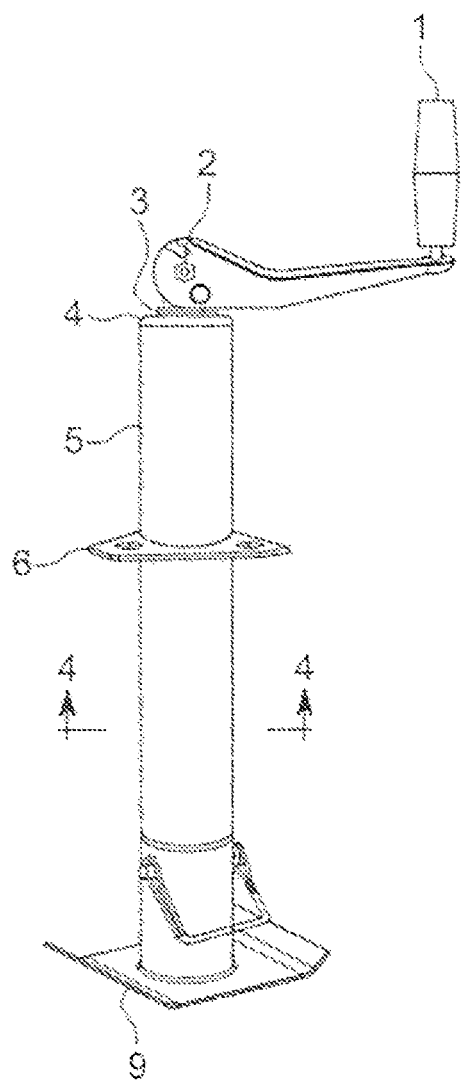

The current a-frame trailer jack installed on utility or travel trailers connected to a pickup may interfere with said pickup tailgate when opening. The upper part of the jack is too high above the trailer tongue/a-frame causing this interference. Also, the jack requires many rotations of a crank handle to either lower or raise the jack foot to attach or detach the trailer from the towing vehicle. Approximately half of the crank handle rotations are merely to get the foot of the trailer jack retracted after the trailer has been connected to the tow vehicle or to lower the jack foot from the retracted position to the ground in order to begin raising the trailer tongue to disconnect it from the tow vehicle.

| References Cited | | |
| --- | --- | --- |
| 10,730,488 B2 | August 2020 | Moreno |
| 9,308,894 B2 | April 2016 | Lusty |
| 8,910,924 B2 | December 2014 | Alanko |
| 8,348,241 B2 | January 2013 | Trowbridge |
| 8,246,011 B1 | August 2012 | Fox |
| 8,091,922 B2 | January 2012 | McMahan |
| 7,611,160 B1 | November 2009 | Ignacio |
| 5,174,550 A | December 1992 | Pittman |
| 4,842,252 A | June 1989 | McMahan |
| 4,796,864 A | January 1989 | Wilson |
| 4,316,601 A | February 1982 | Osborne |
| 4,238,113 A | December 1980 | Adams |
| 3,851,855 A | December 1974 | Douglass |
| 3,595,527 A | July 1971 | Douglass |

PRIOR ART

A typical current design trailer jack is used to support the tongue weight of a trailer when the trailer hitch is not fastened to a tow vehicle and generally comprises an outer tube mounted to the trailer A-frame and an inner tube coupled in concentric telescoping relation to the outer tube and incorporating a single lead screw that is journaled for rotation in the outer tube about a longitudinal axis. The lead screw is threaded into a traveling nut that is affixed to the top of the inner tube so that when the lead screw is rotated by a hand crank, the inner tube can be made to project further from or retract back into the outer tube, depending on the direction of rotation of the crank.

There are two major disadvantages of this type of jack. One, the height of the jack outer tube above the trailer A-frame often causes interference with the tailgate of the towing vehicle when attached to the trailer. Second, it takes many rotations of the crank to move the inner tube between a retracted position needed to provide ground clearance when the trailer is being towed and an extended position needed to elevate the trailer tongue when decoupling the trailer tongue receiver from the ball hitch of the tow vehicle.

One solution to the interference problem is as shown in Moreno U.S. Pat. No. 10,730,488 where the entire jack can be raised or lowered. A pin can be pulled or other locking device and the jack lowered to eliminate interference. However, the pin must be pulled again to raise the jack to create ground clearance prior to towing. The two-stage design as detailed in this patent eliminates this issue.

There are also alternative approaches to quickly lower the jack foot as sited in many of the referenced patents. However, they all require proactive user actions to lower the jack and again must be repositioned up prior to towing. The two-stage design as detailed in this patent eliminates this issue.

SUMMARY

The Low-Profile A-Frame Trailer Jack looks similar, mounts the same and has the same purpose of the traditional, currently available a-frame trailer jack. The difference is the Low-Profile A-Frame Trailer Jack height above the trailer frame is reduced by over 50%. This height difference eliminates the problem interference. The embodiment of this disclosure comprises a novel two-stage design using two concentric telescoping lead screws translating into the reduction of overall jack height. The two-stage concentric lead screws also provide a novel two-speed raising and lowering of the jack foot reducing the number of hand crank rotations required when the trailer jack foot is not loaded by the trailer weight. The speed improvement amount depends on the thread pitch sizer increase selected for the outer screw verses the inner screw.

DRAWING DESCRIPTIONS

FIG. 1: Pictorial view comparing the Low-Profile A-Frame Trailer Jack to a typical current jack design.

Figure 2:
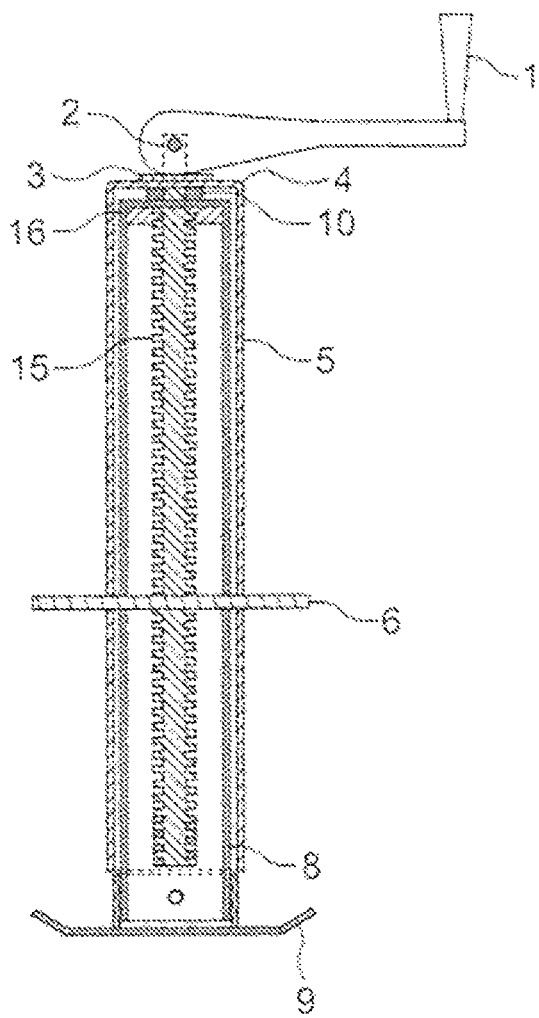
Figure 2:
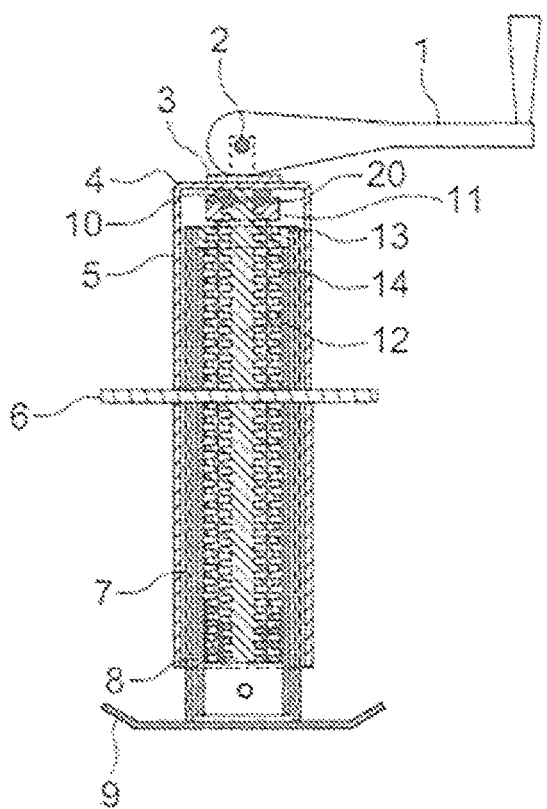

FIG. 2: Vertical cross section of the Low-Profile A-Frame Trailer Jack compared to a typical current jack design in the retracted position.

Figure 3:
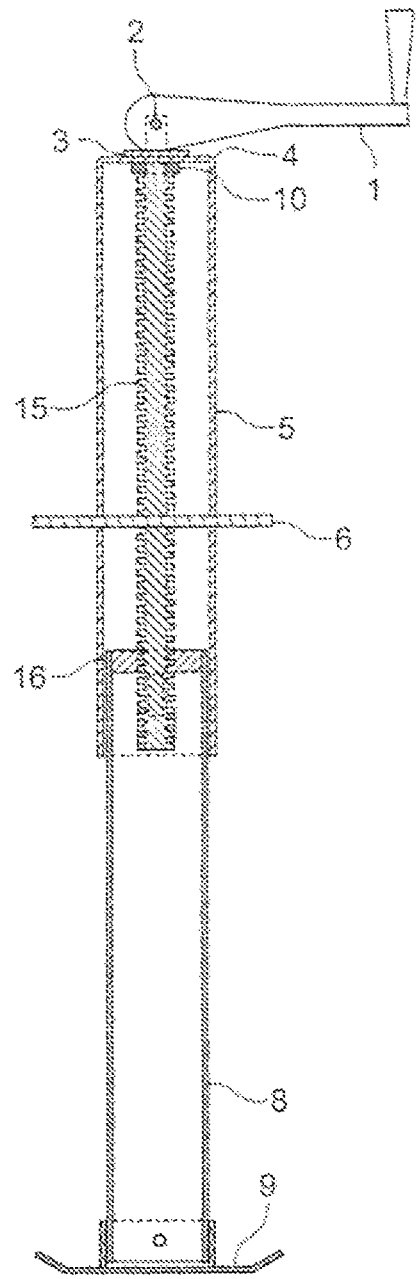
Figure 3:
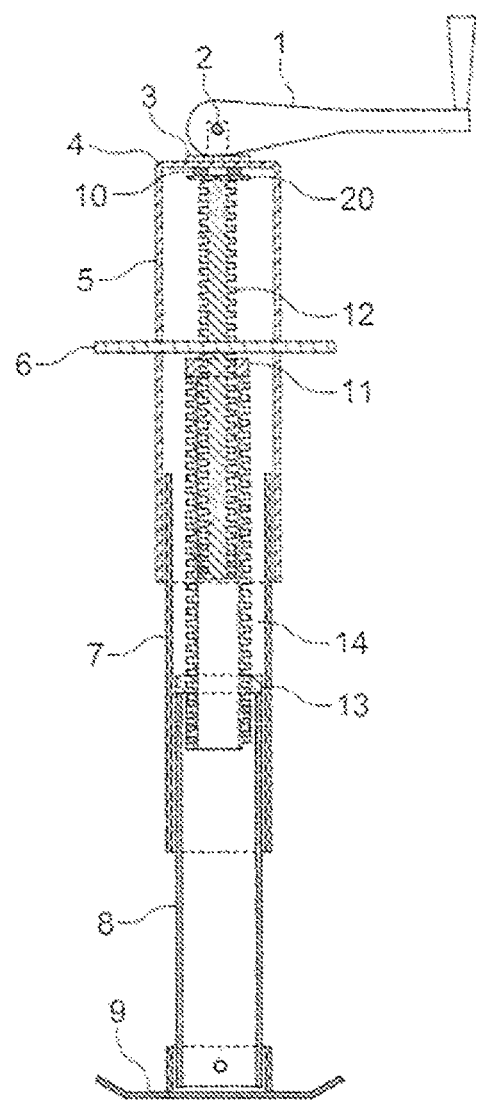

FIG. 3: Vertical cross section of the Low-Profile A-Frame Trailer Jack compared to a typical current jack design in the extended position.

Figure 4:
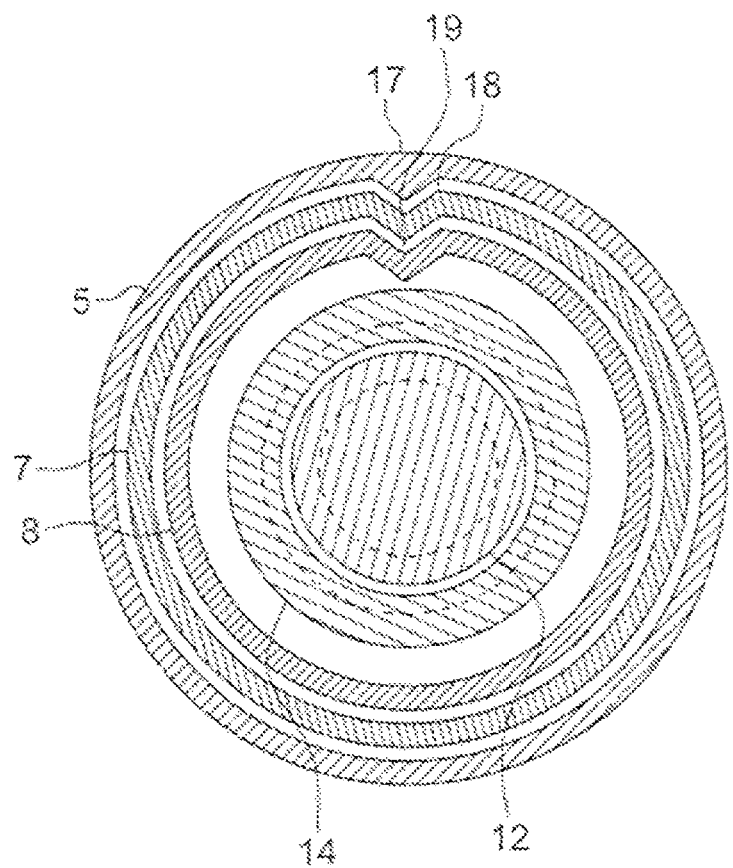

FIG. 4: Horizontal cross section of the Low-Profile A-Frame Trailer Jack.

Figure 5:
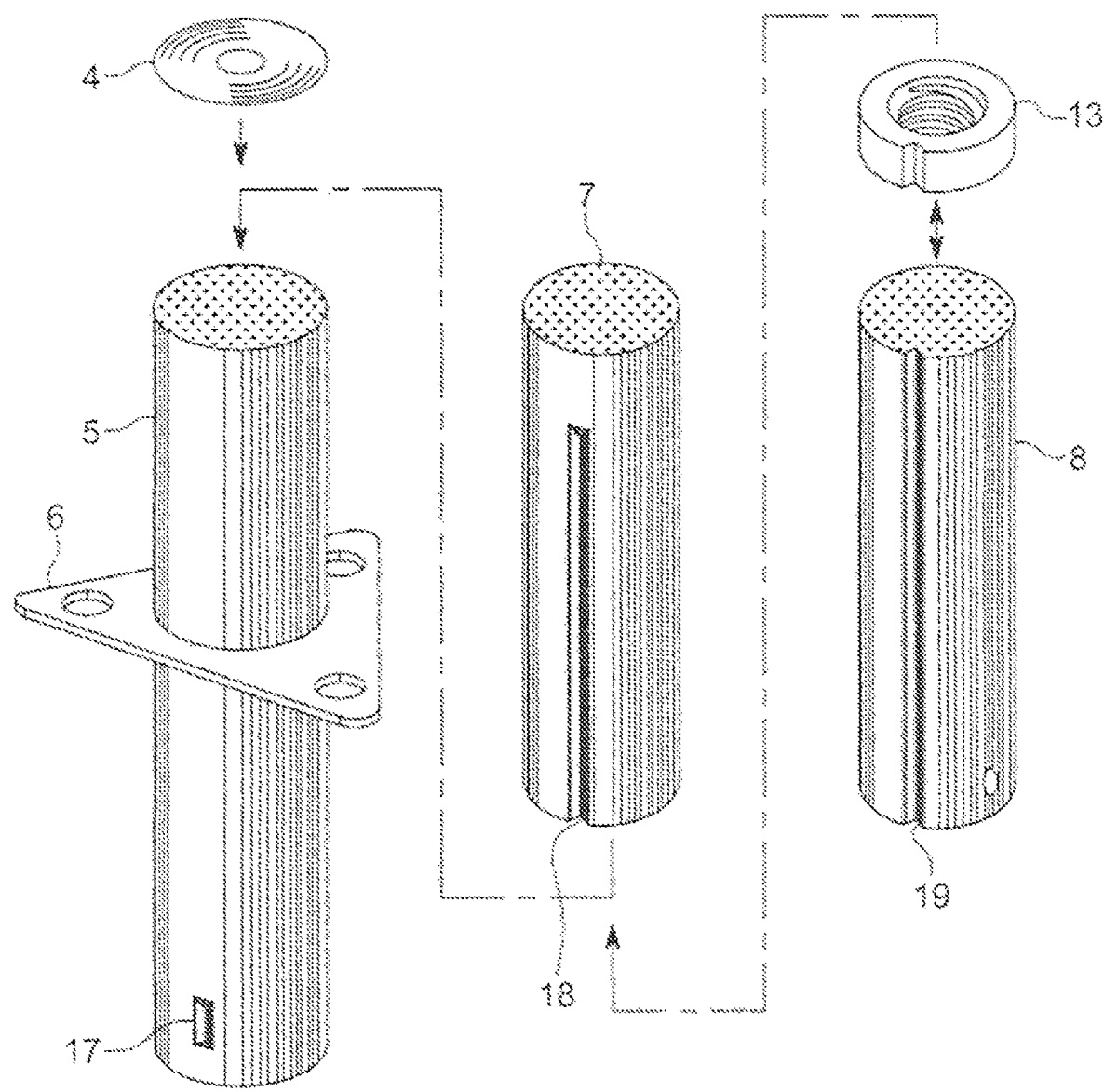

FIG. 5: Tube assembly pictorial for the Low-Profile A-Frame Trailer Jack.

Figure 6:
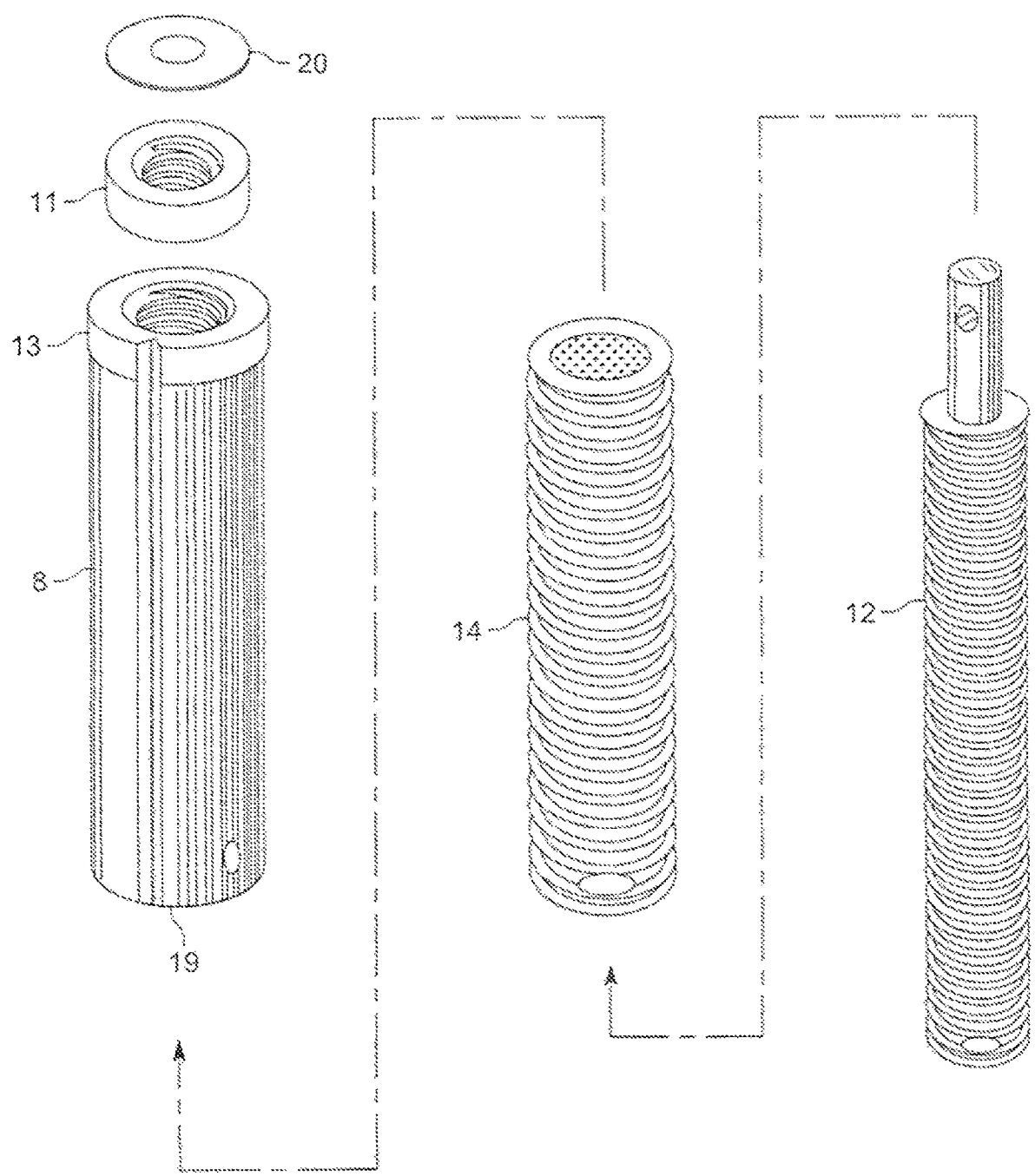

FIG. 6: Lead screw assembly pictorial for the Low-Profile A-Frame Trailer Jack.

DETAILED DESCRIPTION

FIG. 1 is a pictorial view comparing the external appearance of the new, low-profile design to the traditional current design. The crank handle 1, bolt 2, washer 3, cap 4, mounting plate 6, and foot 9 are the same. The low-profile jack outer tube 5 also looks the same, but is reduced to over half the height of the current design above the mounting plate 6 while the foot 9 in both designs remain at the same position.

Note that both designs can have alternative design elements depending on the application. For example, either design can have a crank handle 1 that is mounted 90 degrees from the design shown here using two beveled gears rather than having the crank handle 1 connected directly. Also, an electric motor can be used instead of a manual crank handle 1 for heavier trailers. Either design can also have a different foot 9. Instead of being attached with a pin as show, the foot 9 can be attached with a bolt, screw or permanently affixed. The foot 9 can also be replaced with a removeable caster wheel. These alternatives to the hand crank 1 and the foot 9 have been detailed in prior art.

FIGS. 2 and 3 are vertical cross sections comparing the cranking function of the new low-profile design to the current design. FIG. 2 shows both jacks in the retracted position. This position parks the jack after the trailer has been connected to the tow vehicle and is ready to be towed. FIG. 3 shows both jacks in the extended position used to disengage the trailer from the tow vehicle and to park the trailer after it has been separated from the tow vehicle. Note that in both figures the jacks are aligned where they mount to the trailer at the mounting plate 6 and rest on the ground at the foot 9. This shows a 50% reduction in height above the trailer frame for the low-profile design yet raises and lowers the trailer to the same height.

Current Design

With the current design, as the crank handle 1 is rotated the lead screw 15 also rotates. The lead screw 15 remains in place restricted to move up or down as it is locked in place with the thrust bearing 10, cap 4, washer 3, crank handle 1 and bolt 2. The top end of the lead screw 15 is journaled for rotation about a central longitudinal axis. A thrust bearing 10 is mounted on the lead screw 15 journal. The lead screw 15 journal protrudes through a hole in the cap 4 which is affixed to the outer tube 5. A washer 3 is slipped on the lead screw 15 journal. The crank handle 1 is attached to the lead screw 15 journal with a bolt 2 locking the lead screw 15 in place. A lead screw nut 16 is affixed to the top end of inner tube 8. As the crank handle 1 is rotated, lead screw 15 is also rotated, inner tube 8 is displaced with respect to the outer tube 5 depending on the direction the crank handle 1 is rotated. When the foot 9, that is attached to the inner tube 8, meets ground resistance, the thrust bearing 10 reduces friction allowing the crank handle 1 to be rotated with minimal resistance. The crank handle 1 is rotated until the desired height of the trailer tongue is achieved. The threads at the bottom of the lead screw 15 are welded or distorted to prevent the screw from being rotated beyond the end.

Low-Profile Design

The Low-Profile A-Frame Jack is designed the same from the top of the inner lead screw 12 journal, through the thrust bearing 10, cap 4, washer 3, bolt 2 and crank handle 1. However, a washer 20 is affixed to the top of the inner lead screw 12 above the threads at the base of the journal. The inner lead screw 12 is shorter compared to the lead screw 15 in the current design although of the same pitch. The Low-Profile A-Frame Jack has an outer lead screw 14. The outer lead screw 14 is bored to concentrically accept the inner lead screw 12 with no resistance and is of a larger pitch if a two-speed design is desired. The inner lead screw nut 11 is affixed to the top of the outer lead screw 14. An outer lead screw nut 13 is affixed to the top of inner tube 8. As the crank handle 1 is rotated in either direction the inner lead screw 12 or outer lead screw 14 also rotate through their respective lead screw nuts 11 and 13 raising or lowering the inner tube 8 and therefore the foot 9. The middle tube 7 is free to move up or down as the inner tube 8 and therefore foot 9 move. The middle tube 7 prevents the outer lead screw 14 from being seen as the jack is extended and also prevents the inner tube 8 from rotating. Again, note that the inner lead screw 12 typically would have a higher thread count (smaller pitch) than the outer lead screw 14. The washer 20 is frictionally engaged with the top of inner lead screw nut 11 when fully retracted as the inner lead screw nut 11 top surface and washer 20 are on the same plane.

This creates a detent between the inner lead screw 12 and inner lead screw nut 11. An additional detent can be created between the inner lead screw 12 and inner lead screw nut 11 by creating a thread distortion just below the washer 20 on the inner lead screw 11.

When the crank handle 1 is rotated to lower the jack foot 9, the outer lead screw 14 will rotate first creating a faster rate of extension of the inner tube 8. When either the outer lead screw 14 has been fully extended or the foot 9 has contacted the ground the inner lead screw 12 will now begin to rotate thereby increasing the mechanical advantage, but slowing the inner tube 8 extension speed. When retracting, the inner lead screw 12 will begin to turn first until the washer 20 is fully engaged with the inner lead screw nut 16 at which time the outer lead screw 14 will rotate until the inner tube 8 is fully retracted.

FIG. 4 is a cross section of the Low-Profile A-Frame Jack. The three tubes and two lead screws are coaxially aligned with sufficient separation for frictionless relative movement. There is a dimple 17 on the outer tube 5. There is a middle tube groove 18 on the middle tube 7 that interacts with the dimple 17 to prevent the middle tube 7 from rotating relative to the outer tube 5 and limits the vertical travel down to approximately half the total jack extended distance. There is an inner tube groove 19 on the inner tube 8 that aligns with the middle tube groove 18 on the middle tube 7 to also prevent the inner tube 8 from rotating relative to both the middle tube 7 and outer tube 5. The dimple 17 and middle tube groove 18 and inner tube groove 19 can also be viewed for additional clarity in FIG. 5—Tube Assembly Pictorial.

The tube assembly pictorial in FIG. 5 shows how the tubes of the new Low-Profile A-Frame Trailer Jack are assembled. The mounting plate 6 is affixed to the outer tube 5 appropriate for the application. Middle tube 7 is inserted through the top of the outer tube 5 aligning the middle tube groove 18 with the dimple 17. The cap 4 is then affixed to the top of the outer tube 5. This seals the middle tube 7 in the outer tube 5. Inner tube 8 with the attached outer lead screw nut 13 is inserted into the bottom of middle tube 7 aligning inner tube groove 19 with middle tube groove 18.

FIG. 6 shows the assembly of lead screws 12 and 14 into the inner tube 8. Outer lead screw 14, with the bottom threads welded or distorted, is inserted through the bottom of inner tube 8 and threaded into the already affixed outer lead screw nut 13. The inner lead screw nut 11 is then affixed to the top of outer lead screw 14. Inner lead screw 12, with the bottom threads welded or distorted, is inserted into the bottom of outer lead screw 14 up through inner lead screw nut 11. Washer 20 is then affixed to the top of inner lead screw 12 at the base of the journal.

The thrust bearing 10 is inserted onto the inner lead screw 12 journal. The inner tube assembly is then inserted into the middle/outer tube assembly aligning middle tube groove 18 and inner tube groove 19. The protruding inner lead screw 12 journal is inserted into the receiving hole of cap 4. The washer 3, crank handle 1 and bolt 2 are attached. The foot 9 is attached to the bottom of inner tube 8 at this time. This completes the assembly of the Low-Profile A-Frame Trailer Jack.

What is claimed is:

1. A low-profile a-frame trailer jack comprising:
   (a) an outer tube of a predetermined cross-sectional shape and size;
   (b) a middle tube of the predetermined cross-sectional shape concentrically received within the outer tube;
   (c) an inner tube of the predetermined cross-sectional shape concentrically received within the middle tube;
   (d) an outer lead screw with an inner bore to concentrically receive an inner lead screw and be concentrically received within the inner tube;
   (e) the inner lead screw comprising a journaled section at a top of the outer tube for rotation about a central longitudinal axis of the outer tube and concentrically received within the outer lead screw;

(f) a first travelling nut affixed to a top of the inner tube threadedly engaged with the outer lead screw;

(g) a second travelling nut affixed to a top of the outer lead screw threadedly engaged with the inner lead screw;

(h) a hand crank for rotating the inner lead screw; rotation of the inner lead screw creates relative movement of the inner lead screw relative to the outer lead screw, the outer tube relative to the middle tube and the inner tube, and the middle tube relative to the inner tube;

(i) a cap affixed to the top of the outer tube, a mounting plate affixed to the outer tube for lift application and a foot or a caster wheel attached to a bottom of the inner tube to rest on the ground.

2. The low-profile a-frame trailer jack of claim 1, further comprising a thrust bearing located between the cap and a lower washer; the thrust bearing configured allow rotation of the hand crank with minimal frictional resistance.

3. The low-profile a-frame trailer jack of claim 2, wherein an upper washer is affixed to an upper surface of the cap.

4. The low-profile a-frame trailer jack of claim 3, wherein the journaled section of the inner lead screw passes through the lower washer, the thrust bearing, the cap and the upper washer.

5. The low-profile a-frame trailer jack of claim 1, wherein the middle tube has a first longitudinal groove on an outer surface thereof.

6. The low-profile a-frame trailer jack of claim 5, wherein the outer tube has a dimple impression on an inner surface aligned with the first longitudinal groove of the middle tube to prevent a relative rotation between the middle tube and the outer tube.

7. The low-profile a-frame trailer jack of claim 6, wherein the dimple impression of the outer tube is located near a bottom of the outer tube.

8. The low-profile a-frame trailer jack of claim 6, wherein the first longitudinal groove extending from a bottom to near a top of the middle tube.

9. The low-profile a-frame trailer jack of claim 8, wherein the first longitudinal groove is accompanied with a first longitudinal projection on an inner surface of the middle tube; the first longitudinal projection of the middle tube aligned with a second longitudinal groove of the inner tube to prevent a relative rotation between the middle tube and the inner tube.

10. The low-profile a-frame trailer jack of claim 9, wherein the second longitudinal groove of the inner tube extending from a bottom to a top of the inner tube.

11. The low-profile a-frame trailer jack of claim 9, wherein the first travelling nut comprises a third groove on an outer surface thereof.

12. The low-profile a-frame trailer jack of claim 11, wherein the third groove of the first travelling nut aligned with the first longitudinal projection of the middle tube.

13. The low-profile a-frame trailer jack of claim 1, wherein the foot or the caster wheel is removably attached to the bottom of the inner tube with a pin, a bolt or a screw.

14. The low-profile a-frame trailer jack of claim 1, wherein the foot or the caster wheel is permanently attached to the bottom of the inner tube.

15. The low-profile a-frame trailer jack of claim 1, wherein the predetermined cross-sectional shape is circular shape.

16. The low-profile a-frame trailer jack of claim 1, wherein the mounting plate is triangular shaped and comprises mounting holes.

17. The low-profile a-frame trailer jack of claim 1, wherein the mounting plate is affixed to an outer surface of the outer tube.

18. The low-profile a-frame trailer jack of claim 1, wherein the hand crank is removably attached to the inner lead screw with a bolt.

19. A low-profile a-frame trailer jack comprising:

(a) an outer tube of a predetermined cross-sectional shape and size;

(b) a middle tube of the predetermined cross-sectional shape concentrically received within the outer tube;

(c) an inner tube of the predetermined cross-sectional shape concentrically received within the middle tube;

(d) an outer lead screw with an inner bore to concentrically receive an inner lead screw and be concentrically received within the inner tube;

(e) the inner lead screw comprising a journaled section at a top of the outer tube for rotation about a central longitudinal axis of the outer tube and concentrically received within the outer lead screw;

(f) a first travelling nut affixed to a top of the inner tube threadedly engaged with the outer lead screw;

(g) a second travelling nut affixed to a top of the outer lead screw threadedly engaged with the inner lead screw;

(h) an electric motor for rotating the inner lead screw; rotation of the inner lead screw creates relative movement of the inner lead screw relative to the outer lead screw, the outer tube relative to the middle tube and the inner tube, and the middle tube relative to the inner tube;

(i) a cap affixed to the top of the outer tube, a mounting plate affixed to the outer tube for lift application and a foot or a caster wheel attached to a bottom of the inner tube to rest on the ground.

20. The low-profile a-frame trailer jack of claim 19, further comprising a thrust bearing and an upper washer; the thrust bearing located between the cap and a lower washer; and wherein the predetermined cross-sectional shape is circular.

* * * * *